(12) United States Patent
Dijk

(10) Patent No.: US 6,557,835 B2
(45) Date of Patent: May 6, 2003

(54) APPARATUS FOR MIXING AND AERATING LIQUID-SOLID SLURRIES

(76) Inventor: Gerard Van Dijk, 7521 Tyndale Crescent, Burnaby, British Columbia (CA), V5A 4K2

(*) Notice: Subject to any disclaimer, the term of this patent is extended or adjusted under 35 U.S.C. 154(b) by 0 days.

(21) Appl. No.: 09/949,152

(22) Filed: Sep. 7, 2001

(65) Prior Publication Data

US 2002/0089073 A1 Jul. 11, 2002

Related U.S. Application Data

(63) Continuation-in-part of application No. 09/452,111, filed on Nov. 30, 1999, now abandoned.

(51) Int. Cl.$^7$ ................................................. B01F 3/04
(52) U.S. Cl. .......................................... 261/87; 210/220
(58) Field of Search ............................ 261/87; 210/220

(56) References Cited

U.S. PATENT DOCUMENTS

| | | | | |
|---|---|---|---|---|
| 2,077,445 A | * | 4/1937 | Wallace ........................ | 261/93 |
| 3,400,051 A | | 9/1968 | Hofschneider | |
| 3,439,807 A | | 4/1969 | Danjes | |
| 3,992,491 A | | 11/1976 | Ihrig et al. ..................... | 261/87 |
| 4,231,974 A | | 11/1980 | Engelbrecht et al. .......... | 261/87 |
| 4,259,267 A | | 3/1981 | Wang ........................... | 261/93 |
| 4,263,143 A | | 4/1981 | Ebner et al. ................. | 210/629 |
| 4,290,885 A | | 9/1981 | Kwak .......................... | 210/197 |
| 4,306,969 A | | 12/1981 | Tamura ........................ | 210/201 |
| 4,465,645 A | | 8/1984 | Kaelin .......................... | 261/87 |
| 4,571,090 A | | 2/1986 | Weetman et al. ............ | 366/270 |
| 4,643,972 A | | 2/1987 | Young ......................... | 435/252 |
| 5,512,217 A | | 4/1996 | Batterham et al. .......... | 261/36.1 |
| 5,660,766 A | | 8/1997 | Van Dyk ...................... | 261/87 |
| 5,874,003 A | | 2/1999 | Rose ............................ | 210/626 |
| 6,126,150 A | | 10/2000 | Van Dyk ...................... | 261/87 |

FOREIGN PATENT DOCUMENTS

| | | |
|---|---|---|
| CH | 632224 | 12/1982 |
| DE | 2904101 | 8/1980 |
| EP | 71767 | 2/1983 |
| FR | 855252 | 5/1940 |
| GB | 741652 | 12/1955 |

OTHER PUBLICATIONS

Cane Sugar Handbook 12$^{th}$ Edition, Authors: James C.P. Chen, Chung Chi Chou, p. 477.

* cited by examiner

Primary Examiner—Chester T. Barry
(74) Attorney, Agent, or Firm—Madson & Metcalf

(57) ABSTRACT

An apparatus for dispersing a gas in a liquid or slurry has a reaction vessel with an inner zone for the downward flow of liquid, an outer zone for the upward flow of liquid, a plurality of aerators in the outer zone and a propeller to induce downward flow in the inner zone and promote mixing and circulation of the liquid/slurry. The apparatus is particularly suitable for use in the bacterial decomposition of organic waste matter, for efficiently aerating large volumes of waste/water slurries.

8 Claims, 2 Drawing Sheets

APPARATUS FOR MIXING AND AERATING LIQUID-SOLID SLURRIES

RELATED APPLICATION

This is a continuation-in-part of application Ser. No. 09/452,111, filed Nov. 30, 1999 now abandon.

TECHNICAL FIELD

The invention pertains to an apparatus for introducing and dispersing a gas in a liquid or slurry, preferably for aerating liquid-solid organic waste mixtures in order to accelerate the decomposition of the organic matter.

BACKGROUND

In the field of organic waste treatment, decomposition of organic matter, such as vegetable wastes and sewage, can be effected by introducing suitable bacteria into a tank containing a slurry of the organic matter in water, while aerating and mixing the slurry. Thorough aeration of the slurry, in the form of fine air bubbles dispersed throughout the slurry, accelerates such decomposition by providing ample oxygen to the bacteria.

In International Publication No. WO-97/11034, published Mar. 27, 1997, there is disclosed a submersible mixing impeller for use in effecting aeration of liquids in slurries. It has been found that in a reaction vessel, typically a cylindrical tank, having a diameter up to about 14 feet, a single such impeller is able to efficiently aerate and mix the slurry. However, in reaction vessels having larger diameters, a single mixing impeller is insufficient to circulate the entire volume of slurry, resulting in uneven digestion of the biodegradable material, as evidenced by uneven temperatures in different parts of the tank. As a result, longer periods of time are required to effect complete digestion of the waste material. The use of such larger reaction vessels is very desirable in the treatment of organic waste mixtures, in order to achieve economies of scale. There is accordingly a need for an apparatus for efficiently aerating large batches of liquid-solid organic waste mixtures.

SUMMARY OF INVENTION

The invention provides an apparatus which can both introduce sufficient volumes of air (or other gas) into a slurry (or liquid) and at the same time circulate the slurry in a manner that is constantly bringing non-aerated slurry into proximity with the aerators. This is achieved by providing a reaction vessel with a radially inner zone for the downward flow of unaerated slurry, a radially outer zone, having a plurality of aerators, for the upward flow of aerated slurry, and a mixing propeller at the bottom of the inner zone to draw slurry downward in that zone and disperse it into the outer zone.

DETAIL DESCRIPTION OF THE PREFERRED EMBODIMENT

Figure 1:
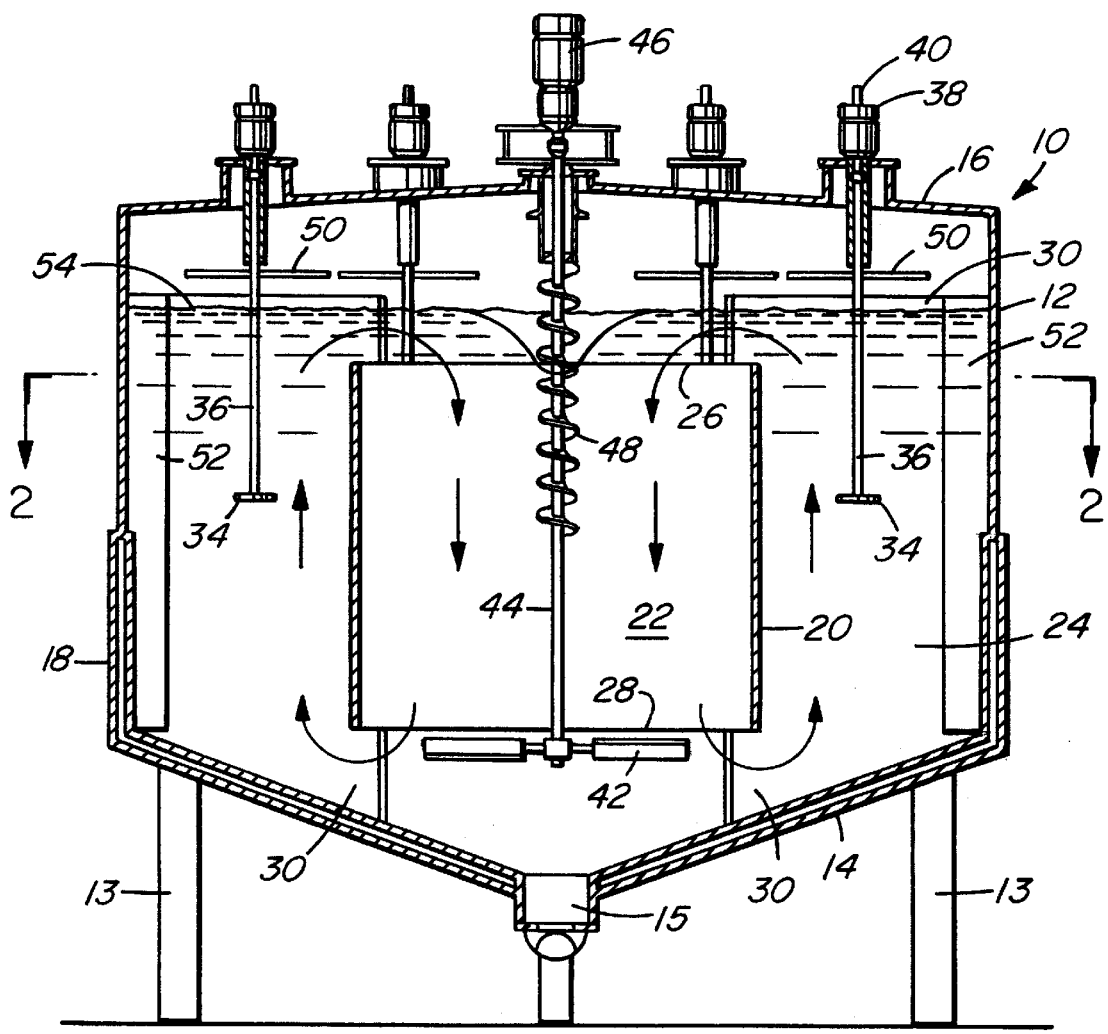
FIG. 1 is a view partly in elevation and partly in vertical section, of an apparatus embodying the invention.
Figure 2:
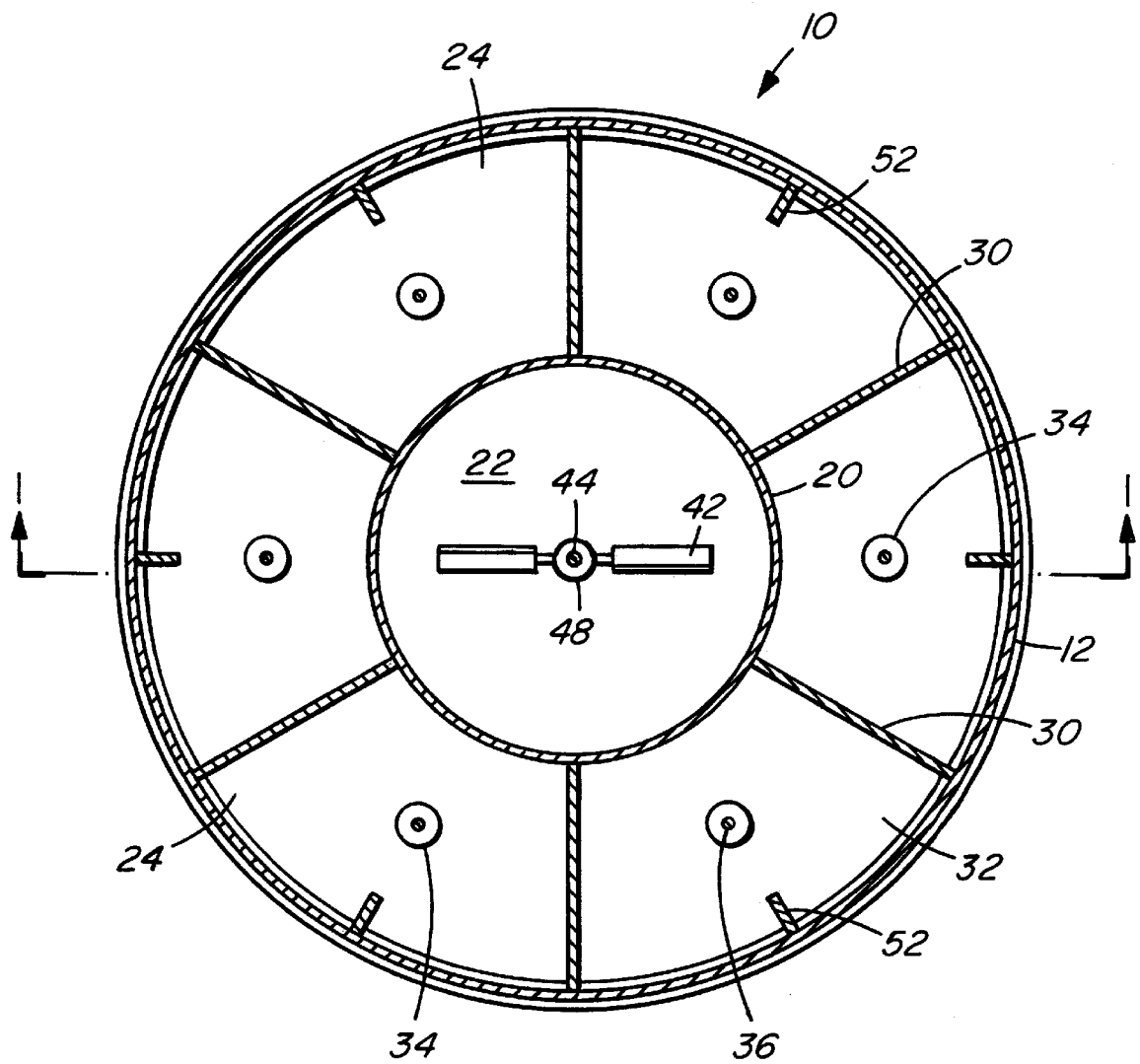
FIG. 2 is a sectional view along the line 2—2 of FIG. 1.

Referring to FIGS. 1 and 2, reaction vessel 10 has a cylindrical outer sidewall 12, a sloping bottom wall 14 and a top cover 16. The vessel is supported by legs 13. The bottom wall 14 has drain 15 at the lowest part thereof, controllable by a valve, for emptying the reaction vessel. The bottom wall 14 and the lower part of the sidewall 12 have a steam jacket 18 to provide for heating of the contents of the reaction vessel.

A cylindrical wall 20 is suspended within the reaction vessel 10. The cylindrical wall 20 divides the reaction vessel 10 into a radially inner zone 22 and a radially outer zone 24. The wall 20 is open at its upper end 26 and at its lower end 28 and does not extend to the top cover 16 and bottom wall 14, permitting the slurry to flow between the inner zone 22 and the outer zone 24.

Radially-extending partition walls 30 are preferably provided, extending between cylindrical wall 20 and outer sidewall 12, dividing the outer zone 24 into sections 32. Six such partition walls 30 are provided in the embodiment illustrated in the drawings, forming six sections 32. The partition walls 30 support cylindrical wall 20 and preferably extend to the bottom wall 14 of the reaction vessel.

Mixing impellers 34 are provided in outer zone 24, one in each section 32. The mixing impellers (i.e. aerators) 34 have outwardly extending blades and are of the type, known in the prior art, that draw gas down a hollow shaft as they rotate with the shaft, and eject it into the liquid or slurry in which they are submerged. Preferably, mixing impeller 34 is of the type described in International Publication No. WO 97/11034, published Mar. 27, 1997, entitled "Submersible Mixing Impeller," and more particularly in FIG. 5 thereof. Each mixing impeller 34 is submerged in the liquid or slurry in the reaction vessel 10 on the end of hollow shaft 36. Shaft 36, and therefore impeller 34, is rotated by electric motor 38, which is mounted on top cover 16 of the reaction vessel. Such rotation, at a speed of about 1,800 r.p.m. draws a vacuum which causes air to be drawn from the atmosphere into hollow shaft 36 through air intake 40, into the body of impeller 34, and to be expelled into the slurry through exit ports in the impeller as fine bubbles.

Propeller 42 is mounted on the lower end of propeller shaft 44 and is rotated by electric motor 46 which is mounted on the centre of top cover 16. Propeller 42 is preferably positioned between the lower edge 28 of cylindrical wall 20 and the bottom wall 14 of the reaction vessel. Its blades are oriented so as to cause a downward flow of liquid when it is rotated. Shaft 44 is provided with helical flights 48 in the region extending between the top cover 16 of the vessel and into inner zone 22. Flights 48 are oriented so as to cause a downward force or flow as shaft 44 is rotated, in order to submerge floating materials, such as a straw, into the slurry in the vessel.

Horizontally-extending bars 50 are provided on impeller shafts 36 slightly above the surface 54 of the slurry in the vessel. They rotate as shafts 36 rotate, effecting a breaking of foam that forms at the surface 54 of the slurry.

Baffles 52 are preferably provided on the sidewall 12 of the vessel, extending radially inward adjacent each mixing impeller 34. Their purpose is to impede any horizontal flow of slurry within outer zone 24 and thus promote a smooth upward flow of slurry within such zone.

The above-described apparatus is used in the following manner. The organic matter to be treated is introduced in slurry form into the reaction vessel 10 through a port (not shown in the drawings) in the top cover 16. Typically, up to about 11% of solids in the slurry is preferred. Suitable bacterial cultures for the aerobic decomposition of the organic waste are added to the slurry, typically by introducing treated slurry from a previous batch. The propeller motor 46 is actuated, rotating the propeller 42. Impeller motors 38 are actuated, rotating the impeller shafts 36 and impellers 34. Rotation of the impellers 34 causes air in the atmosphere to be drawn in through inlets 40, and be expelled through exit ports in the impellers 34 into the slurry in the outer zone 24 as fine bubbles. The bubbles rise and induce an upward flow of slurry in outer zone 24. As they rise, air in the bubbles dissolves in the slurry and is available for use by the bacteria in the slurry. Undissolved air escapes at the liquid surface 54 into the airspace in the vessel. In the inner zone 22, a downward flow of slurry is induced by the rotation of propeller 42. Slurry that comes to the top of the outer zone 24 flows inward over the top edge 26 of cylindrical wall 20 into the inner zone 22. Such slurry, substantially depleted of air bubbles, which have either dissolved or escaped at the surface, flows downward in the inner zone, by virtue of its density, i.e. being denser than the bubble-filled slurry rising in the outer zone, and the effect of propeller 42 and flights 48. As such slurry passes the lower edge 28 of cylindrical wall 20, it flows outward and upward into the outer zone 24, assisted by the mixing action caused by propeller 42. It rises in the outer zone 24 and is aerated by impellers 34. A steady circulation within the reaction vessel is thus achieved, as generally indicated by the arrows in FIG. 1. Floating materials, such as straw, are submerged into the slurry by means of flights 48 and move downward propelled by the downward flow of the slurry in inner zone 22.

As will be apparent to those skilled in the art in the light of the foregoing disclosure, many alterations and modifications are possible in the practice of this invention without departing from the spirit or scope thereof. For example, the propeller 42 can be supported on a shaft which extends upwardly through the bottom of the reaction vessel, rather than downwardly from the top, so long as the propeller is positioned to contribute to a downward flow of the liquid in the inner zone 22. Likewise, the aerators can be supported on gas intake tubes which extend upardly to the aerators through the bottom of the reaction vessel, rather than downwardly from the top.

Further, various means for rotating the propeller 42 can be provided other than an electric motor 46; and various means for rotating the aerators 34 can be provided other than electric motors 38. In both cases, any suitable means to effect the rotation can be used, such as motors driven by compressed gas, internal combustion, turbine, etc.

The apparatus can be used for dispersing gas in liquids generally and is, of course, not limited to dispersing air in slurries. Accordingly, the scope of the invention is to be construed in accordance with the substance defined by the following claims.

What is claimed is:

1. An apparatus for dispersing a gas in a liquid, comprising:
   (a) a vessel having a circumferential sidewall;
   (b) a radially inner zone within said vessel for the downward flow of said liquid;
   (c) a radially outer zone between said inner zone and said circumferential sidewall for the upward flow of said liquid within said vessel;
   (d) a propeller mounted on a propeller shaft, said propeller shaft extending generally vertically through said inner zone, and means for rotating said propeller, such that rotation of said propeller induces a downward flow of liquid in said inner zone; and
   (e) a plurality of aerators radially arrayed in said outer zone, each said aerator being mounted on an upwardly-extending rotatable gas intake tube and having means for rotating said aerator, such that rotation of said aerator draws gas down through said gas intake tube and disperses said gas through said aerator into said liquid in said outer zone.

2. An apparatus for dispersing a gas in a liquid, comprising:
   (a) a vessel having a circumferential sidewall;
   (b) a radially inner zone within said vessel for the downward flow of said liquid;
   (c) a radially outer zone between said inner zone and said circumferential sidewall for the upward flow of said liquid within said vessel;
   (d) means for inducing a downward flow of liquid in said inner zone; and
   (e) a plurality of aerators radially arrayed in said outer zone, each said aerator being mounted on a rotatable gas intake tube and having means for rotating said aerator, such that rotation of said aerator draws gas through said gas intake tube and disperses said gas through said aerator into said liquid in said outer zone.

3. An apparatus according to claim 2 wherein said means for inducing comprises a propeller mounted on a propeller shaft and means for rotating said propeller.

4. An apparatus according to claim 1 or 2 further having a partition wall between said inner zone and said outer zone.

5. An apparatus according to claim 4, further having radially-extending walls between said partition wall and said circumferential sidewall of said vessel, between adjacent aerators.

6. An apparatus according to claim 1 or 3 further having a helical screw mounted on said propeller shaft for submerging floating material in said liquid.

7. An apparatus according to claim 5 further comprising baffles positioned between said radially-extending walls, extending radially inward from said circumferential sidewall in said inner zone, adjacent said aerators.

8. An apparatus according to claim 1 further comprising radially-extending members mounted on said gas intake tube for breaking foam on the surface of said liquid.

\* \* \* \* \*